Figure 1:
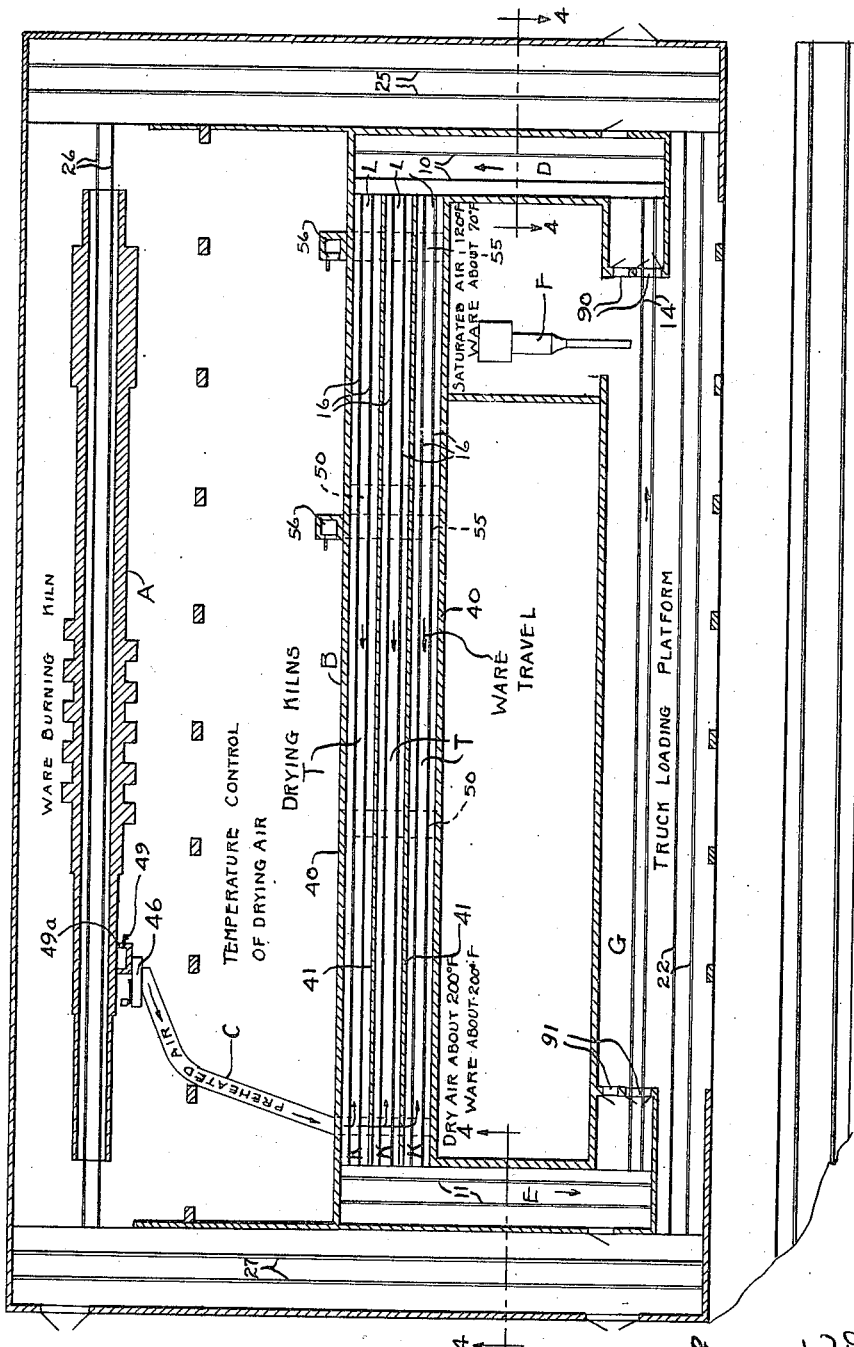

July 23, 1929.  G. W. DENISON  1,721,774
BRICK KILN
Filed Sept. 20, 1924  3 Sheets-Sheet 1

July 23, 1929.  G. W. DENISON  1,721,774
BRICK KILN
Filed Sept. 20, 1924  3 Sheets-Sheet 2

Inventor
George W. Denison

By Bates, Macklin, Goldrick & Teare
Attorneys

July 23, 1929.  G. W. DENISON  1,721,774
BRICK KILN
Filed Sept. 20, 1924  3 Sheets-Sheet 3
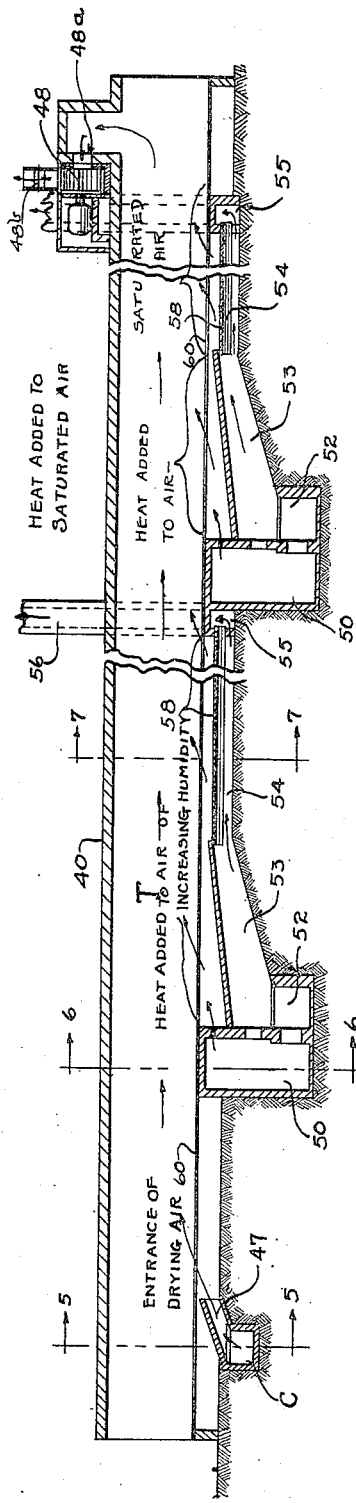
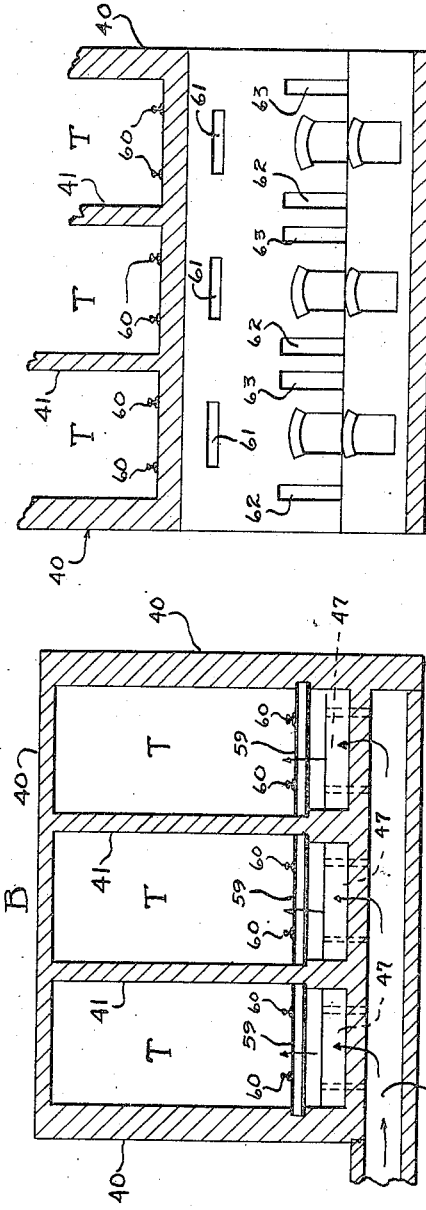
Inventor
George W. Denison
By Bates, Macklin, Goldrick & Teare
Attorneys Patented July 23, 1929.

1,721,774

UNITED STATES PATENT OFFICE.

GEORGE W. DENISON, OF BAY VILLAGE, OHIO.

BRICK KILN.

Application filed September 20, 1924. Serial No. 738,837.

This invention is concerned with apparatus for the production of ceramic products and more particularly to brick and tile manufacturing plants.

An extensive study of thermal conditions in brick and tile burning kilns has resulted in the development of highly efficient continuously operated kilns of the car tunnel type, for brick and tile burning purposes. Such kilns have the thermal environment or conditions thereof automatically controlled by electrical thermostats and their use has resulted in extremely low burning fuel costs, an increase in production in proportion to the invested capital and the production of a uniform and superior product at low labor cost. The use of such modern burning kilns however, necessitates a careful preliminary drying of the ware to eliminate the major portion of the moisture content thereof and also necessitates the careful consideration of other problems arising consequent to its use, such as handling, trafficking, etc., whereby the advantages of its use may not be offset by increased costs about the plant.

For instance, in obtaining proper and efficient drying of the ware, there are essential conditions which must be provided for, such as relieving the strains set up in the ware due to irregularity in pressure in forming it, and which should be relieved preliminary to the vaporization of the moisture in the ware.

The general object of my invention therefore is the provision of a novel process for effecting the efficient drying of the green ceramic ware by progressively subjecting the ware to the influence of a drying medium such as preheated air having the moisture content thereof varying from a condition of complete saturation where the ware is first brought into contact therewith to raise its temperature without causing the removal of any moisture therefrom and whereby as the ware progresses through the process, the temperature thereof is gradually raised in an air environment of decreasing humidity.

Another object of my invention is the provision of a novel, continuously operated drying kiln for ceramic products wherein the velocity of the air may be controlled and the thermal and humidity characteristics regulated to vary the hydroscopic tension of the air while it is forced in contra movement to the progressive movement of the ware and whereby dry preheated air may be introduced at the exit end of the kiln and be discharged from the kiln at a temperature considerably greater than the introductory temperature of the ware and in a saturated condition.

Other objects of my invention will hereinafter be set forth in the following description referring to the accompanying drawings illustrating a preferred form of apparatus for carrying out the steps of my process. The essential characteristics will be summarized in the claim.

Figure 2:
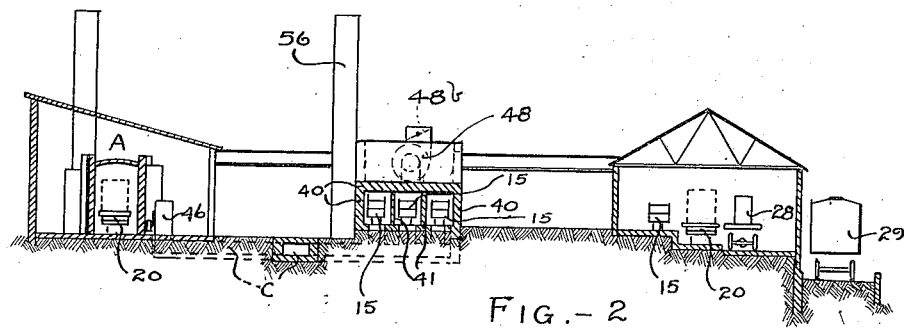
Figure 7:
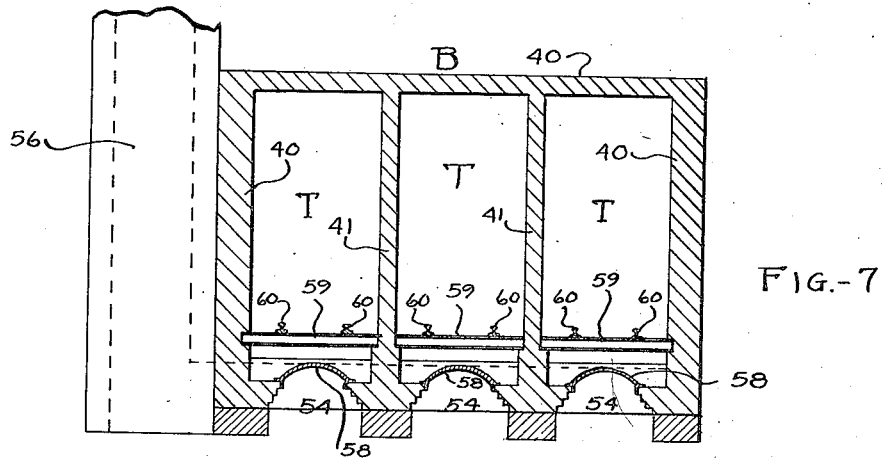
Figure 4:
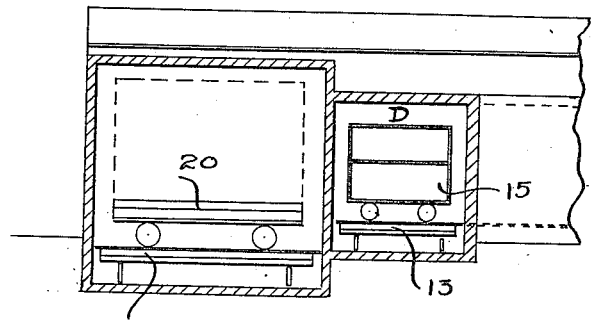

In the drawings, Fig. 1 is a cross sectional plan view of a ceramic plant adaptable for the production of tile and brick and wherein a modern burning kiln such as I have referred to is cooperatively arranged in relation to my novel drying kiln; Fig. 2 is a cross sectional elevation of the plant illustrated in Fig. 1; Fig. 3 is a longitudinal cross sectional elevation of my novel drying kiln tunnel; Fig. 4 is a cross sectional elevation taken substantially along the line 4—4 of Fig. 1; Fig. 5 is a transverse cross sectional elevation on an enlarged scale taken substantially along the line 5—5 of Fig. 3; Fig. 6 is a similar cross sectional elevation taken substantially along the line 6—6 of Fig. 3 and Fig. 7 is a similar cross sectional elevation taken substantially along the line 7—7 of Fig. 3.

In the artificial or accelerated drying of green ceramic ware, it is of importance that the moisture be removed from the ware in a uniform manner in order that the outer portion of the ware exposed to the evaporating influence of a preheated air moving at a relatively high velocity will not first form a dense crust by reason of which moisture is imprisoned and which, when the ware is subsequently burned, would cause various deficiencies such as uneven shrinkage, cracking, blistering, etc.

Practice has demonstrated that to avoid this condition, the ware should first be subjected to a heat soaking process, while preventing the removal of any of the moisture in the ware whereby the temperature of the ware may be uniformly raised before permitting the escape of any of its moisture. Heretofore this has been accomplished in the more expensive driers of the closed type by repeatedly using the same air, drawing it out by the use of a fan or otherwise and forcing it in again, and it has even been attempted to first subject the ware to the temperature influence of moist steam to obtain this preliminary heating without drying. These methods have proven to be inefficient from an economical viewpoint by reason of the inflexibility of the apparatus necessarily used consequent to their fulfillment. In the common short tunnel drier such as is now known in the art, and through which the ware may be progressively moved, it is impossible practically speaking, to obtain saturated air of the proper temperature at the ware entrance end of the tunnel and at the same time maintain a high velocity of the air through the kiln; the latter being important to avoid the formation of stagnant pockets of air which would result in the uneven drying of the ware.

My invention contemplates the use of a kiln of unusual length which may be determined, by the desired air velocity, for rapid and efficient evaporation; the entrance and exit temperature thereof; and the time period of the green ware is subjected to a heat soaking while in a moisture saturated air environment of proper temperature. I have found that this preliminary heat soaking temperature should be approximately 120° Fahrenheit and that the entrance temperature of the dry air at the opposite end of the tunnel should be approximately 200° Fahrenheit. Operating under these thermal conditions, the proper length of the tunnel should be approximately three times the length of drying tunnels such as are now used in the art. I am thus enabled to maintain the velocity of the air substantially three times greater than the velocity of the drying air in the known shorter tunnels and at a greater increased operating efficiency.

However, an accurate control of the humidity and temperature of the drying air relative to the varying temperature of the ware as both traverse the kiln in opposite directions, is an important factor in the successful operation of such a kiln. As the air traverses the tunnel its temperature has a tendency to drop rapidly and of course, its hydroscopic tension would thereby be decreased and since the rate of evaporation of the moisture in the ware is dependent upon the velocity if the unsaturated air and its temperature, it would rapidly become saturated and would accordingly traverse the major portion of the tunnel and function merely as a preheater of the ware.

The ware is introduced into the kiln at approximately 70° Fahrenheit and raised to a temperature of substantially 120° F. while under the environment of saturated air during the preliminary stages of its progress through the kiln. Ordinarily the introduction of the wet ware at such a low temperature, compared to the temperature of the saturated air would result in considerable condensation forming in the ware. It would thus absorb moisture to such an extent as to cause it to mush or lose its preformed shape. To obtain the desired result, the saturated air traversing this part of the kiln must be maintained at a temperature above the temperature of the ware and at a high velocity and I accordingly add heat to the air to interrupt its natural drop in temperature due to heat losses to the ware and to its great increase in humidity. Due to the high velocity of the saturated air the formation of condensate on the ware, when first introduced, is practically eliminated and what condensate is formed is immediately removed by the scrubbing effect of the high velocity air before it can form into globules of water on the ware surfaces.

In Fig. 1, I show a plant layout for the production of ceramic ware such as brick and tile; the product trafficking arrangement of which is particularly adapted to a plant equipped with burning and drying kilns herein referred to. This system is described and claimed in my copending application, Serial No. 703,077. Briefly, the trafficking arrangement is such that there is a flexibility in the transportation system whereby the drying and burning kilns may be continuously operated without necessitating the presence of labor at all times for storing and shipping the finished product or for handling the dry product, even though different types of trucks are used for the drying kilns and the burning kiln.

A single track burning kiln, such as is diagrammatically represented at A, has a burning capacity equal to substantially three times the capacity of one of my drying kilns of the same length. I accordingly have provided three single track drying kilns as shown at B. These kilns are constructed to receive waste heat from the burning kiln A through a conduit or tunnel C. At each end of the drying kilns may be transverse tunnels D and E having tracks 10 and 11 on which are mounted transfer cars 12, see Fig. 4. The transfer cars are adapted to receive the trucks 15 which are loaded, when on the longitudinal track 14, with green ware as it is extruded from the dies of the extruding machine F. The transfer of the loaded truck 15 from the track 14 to the drier kiln track 16 is effected manually and the direction of movement of the product on the tracks 14, 10, 11 and 16 is in the direction of the arrows shown in Fig. 1. The trucks loaded with the dry product are returned to the platform and the product is restacked on burning kiln trucks 20 positioned on the adjacent longitudinal track 22 extending parallel with the track 14. The burning trucks are of greater capacity than the trucks 15 and the ware of course, may be more compactly stacked when dry and the loaded trucks 20 are thereafter transferred by means of transfer trucks 24 on transfer track 25 to the burning kiln track 26. After traversing the burning kiln track, they are returned on transfer truck 27 to track 22 and the finished product may be loaded to road vehicles 28 or railroad cars 29. The burning kiln A is approximately 350 feet long and with the trafficking arrangement briefly discussed, it is possible to obtain drier kilns of unusual length whereby the desired high velocity of the drying air may be maintained, while exhausting it in a completely saturated condition.

A drier kiln adaptable to the foregoing described layout and by which the steps in my process may be efficiently fulfilled will now be described in detail. The drying kilns B may be housed in a common structure subdivided by longitudinal walls to form three single track drier tunnels T. The air entering the exit end of the drier tunnels is taken from the burning kiln A at approximately 1000° F. and forced by a fan 46 through the tunnel C which may extend beneath and terminates at the exit end of the drier tunnels. Ducts 47 extend upwardly from the tunnel C to the drier tunnels. A suction fan 48, preferably disposed above the ware entrance end of the drier tunnels, serves to draw the saturated air out of the tunnels. Since the temperature of the waste air as it leaves the burning kiln A is approximately 1000° F. and it is desired to have the temperature of this air at about 200° F. when entering the drier tunnels, this high temperatured air from the burning kiln may be mixed with normally temperatured air at the fan 46 by regulating the size of the opening 49 in the conduit C, to decrease the temperature of the drying air to the desired point, namely 200° F.

To properly maintain the temperature curve of the drying air so that it will gradually slope from about 190° to 120° from one end to substantially the other end of the tunnel, I provide a heat-radiating means under each drier tunnel track, the heat being supplied by this means to the drying air preferably at two points, equidistantly spaced from the ends of the tunnel and from each other. I have shown in Fig. 3, a preferred form of such means which may comprise transverse compartments 50 and 51 constructed beneath the floors of the drier tunnels to afford access to combustion chambers 52 in which fuel may be burned to create hot gases which are led upwardly through conduits 53 to heat radiating flues 54. The gases, after having given up the major portion of the heat content thereof, escape through transverse flues 55 into the stacks 56.

The transverse transferring tunnels D and E are sealed by doors 90 and 91 respectively whereby both ends of the drying tunnels may be open but atmospherically sealed by said remotely positioned doors. I find that at the temperature and velocity I employ, the tunnel pressure is practically balanced relative to atmospheric pressure, but that a negative pressure exists at the opposite ends L and the transfer tunnel D should therefore be maintained closed except when opened to receive a car of green ware.

As shown in Fig. 7, the floors of the tunnel are preferably arch shaped and formed of iron castings 58 to facilitate the transfer of the heat from the burnt gases in the flues 54 to the drying air traversing the drier tunnels, the floors of the tunnels being adjacent the ties 59 supporting the drier truck rails 60.

The combustion chambers 52 and that portion of the flues comprising the conduits 53 are preferably formed of fire brick and cold air ducts 61, 62 and 63 are provided whereby cold air is admitted around the walls of the respective furnaces to keep the temperature of the fire brick low thereby prolonging the life of the furnace. This cooling air however before commingling with the drying air traversing the tunnels will be sufficiently elevated in temperature to not affect the temperature of the drying air traversing the tunnels. The radiation of heat from the floors of the tunnels is facilitated by the swirling action of the drying air traversing the tunnels due primarily to the baffling effect of the loaded trucks. It will be seen that the temperature of the air may be more accurately controlled by reason of the fact that heat is supplied by separate furnaces at different points through the floors of the tunnels. By regulating the burners of the furnaces and by regulating the capacity of the passageways 49$^a$ and 48$^a$, leading to the fans 46 and 48, respectively. the velocity, temperature and moisture content of the drying air may be accurately regulated as the green ware traverses the tunnel T, from the right to the left of the tunnels, as shown in Fig. 3.

The ware may be progressively moved along the tracks through the tunnels by the use of an endless belt or similar mechanism, but preferably by the novel apparatus illustrated in my copending application Serial No. 703,077.

From the foregoing description of my invention, it will be seen that it is possible to utilize a preheated air having heat units otherwise exhausted or wasted from the burning kiln, also that such air may be driven through the drier tunnel C at an increased velocity over any practice heretofore known in the art, thereby causing a more rapid evaporation of the moisture from the ware; and that a drop in the temperature of the air which would otherwise drop below an efficient temperature consequent to its rapid absorption of moisture as it traverses the tunnel, is prevented by adding a relatively small amount of heat to the air as it traverses the tunnels. Furthermore, the green ware may be properly tempered by being subjected to a preheating in a saturated air environment prior to any actual drying thereof; this environment being supplied by the drying air after it has completed its function of drying the ware and without necessitating any further care in the operation of the apparatus other than the temperature and velocity regulation hereinbefore set forth. Likewise it will be understood that it is possible to introduce the green ware into the saturated air despite the prevailing difference in temperature between them without the formation of condensate on the ware to any damaging extent, for the condensate which has a tendency to form on the ware is immediately swept away by the scrubbing effect of the high velocity saturated air. It will be readily understood that the efficiency of such an apparatus can only be maintained by adding heat to the drying air at points intermediate its ingress and egress to and from the drier tunnels whereby the air enters at approximately 200° F. and is exhausted in a saturated condition at 120° F.

A product dried by my process will be uniform in its structure and be devoid of pronounced cleavages, cracks and blisters after having been passed through the burning kiln.

I claim:—

A drier kiln for brick and tile of the car tunnel type having in combination an air duct and air blower for supplying preheated air to the tunnel at the ware exit end thereof, a valve associated with said air supplying duct for mixing atmospheric air with the drying air before being introduced to the tunnel, air suction means at the opposite end of the tunnel for drawing air in a saturated condition from the tunnel, a valve associated with said air suction means for regulating the velocity of the saturated air as it traverses the ware introductory end of the tunnel, a plurality of furnaces and longitudinally extending flues for supplying heat to the air as it traverses the tunnel, and transversely extending atmospherically sealed tunnels at each end of the drier tunnel, whereby the ends of the drier tunnel proper may be maintained open without causing atmospheric interference with the regulation of the velocity and temperature of the drying air.

In testimony whereof, I hereunto affix my signature.

GEORGE W. DENISON.